United States Patent [19]

Takeuchi et al.

[11] Patent Number: 4,463,038

[45] Date of Patent: Jul. 31, 1984

[54] METALLIC COATING USING TWO COAT ONE BAKE METHOD

[75] Inventors: Kunihiko Takeuchi, Minoo; Hidefumi Okuda, Toyonaka, both of Japan

[73] Assignee: Nippon Paint Co., Ltd., Osaka, Japan

[21] Appl. No.: 425,349

[22] Filed: Sep. 28, 1982

[30] Foreign Application Priority Data

Nov. 2, 1981 [JP] Japan .................................. 56-176213

[51] Int. Cl.$^3$ .............................................. B05D 3/02
[52] U.S. Cl. .................................. 427/407.1; 427/409
[58] Field of Search .................. 427/407.1, 409, 385.5, 427/393.5

[56] References Cited

U.S. PATENT DOCUMENTS 4,254,168  3/1981  Monson ................................ 427/409
4,315,053  2/1982  Poth et al. .................... 427/409 X
4,355,071 10/1982  Chang ............................ 427/409 X
4,359,504 11/1982  Troy ..................................... 427/409
4,382,114  5/1983  Höhlein et al. ................. 427/409 X Primary Examiner—Thurman K. Page
Attorney, Agent, or Firm—Millen & White

[57] ABSTRACT

There is provided a two-coat, one-bake metallic coating method which comprises applying, first, (a) a base coat composition containing an acrylic polyol oligomer having an average molecular weight of 500 to 2000 and a non-yellowing polyisocyanate compound in a NCO-/OH ratio of 0.5/1 through 1/0.5 and further containing an appropriate amount of a metallic pigment and, then, on top thereof (b) a clear top coat composition containing said acrylic polyol oligomer and non-yellowing polyisocyanate compound in a NCO/OH ratio of 0.5/1 through 1/0.5 and causing the resulting coats to cure simultaneously. There are also provided coating compositions to be used in the above coating method.

8 Claims, No Drawings

METALLIC COATING USING TWO COAT ONE BAKE METHOD

FIELD OF THE INVENTION

This invention relates to a two-coat, one-bake metallic coating method and coating compositions used therein.

The coating materials commonly used today for metallic coating of automobiles are based on acrylic-melamine resins, i.e. acrylic resins cured with a melamine resin. This is because these resins provide stable coating materials and, also, coats which are resistant to weathering. Further, to prevent deterioration of the gloss and other aethetic appearance of the coat upon prolonged weathering, it is common practice to use a wet-on-wet coating procedure of the two-coat, one-bake type, wherein a clear coat is superimposed on a pigmented base coat and the two coats are simultaneously baked to cure.

In metallic coating, aluminum pigment is incorporated in the coating matrix to impart a metallic luster to the coat but if the fluidity of the coating material is too high at the time of application there will be a migration of aluminum particles causing an uneven color or gloss and a loss of the metallic tone desired in the finished coat.

In a coating regimen such as the two-coat, one-bake system wherein uncured coating materials are applied in successive layers, the base coat composition must be so designed that the aluminum pigment particles will not drift therein and that the pigment particles will not be dislocated on account of the compatibility of the solvent and resin contained in the clear top coating. For this reason, attempts have been made to decrease the compatibility of the base coat resin and clear coat resin to some extent, to increase the molecular weight of the base coat resin to reduce the influence of the clear top coating, or to use a low-boiling solvent to reduce the amount of solvent present at the time of application. However, none of these known methods is able to prevent migration of aluminum particles.

Recently, from the standpoint of economizing natural resources and energy and because of the requirements for pollution control, much research has been done for increasing the nonvolatile contents of coating materials. However, if an acrylic polyol whose molecular weight has been reduced for increased nonvolatile contents is cured with a melamine resin, the coating film will have only a drastically reduced service life and if such a system is utilized for two-coat, one-bake metallic coating, the disadvantages referred to hereinbefore arise of necessity.

This invention overcomes the above-mentioned disadvantages. Thus, in accordance with this invention, a non-yellowing polyisocyanate is employed as a curing or cross-linking component. This feature coupled with other features described hereinafter, of this invention ensures the following advantages. In accordance with this invention, a low molecular weight acrylic polyol can be used to increase the nonvolatile content of the coating composition. Moreover, the resulting decrease in the required amount of the solvent plus the thickening effect due to the rapid curing reaction of the acrylic polyol with the polyisocyanate compound helps prevent migration of metallic particles to thereby ensure a metallic coat having improved gloss and other aesthetic qualities and improved weather resistance.

DETAILED DESCRIPTION OF THE INVENTION

This invention relates to a two-coat, one-bake metallic coating method wherein a base coat composition containing a first film-forming binder, a metallic pigment and a solvent for said first film-forming binder is applied, a clear top coat composition containing a second film-forming binder and a solvent thereof is applied wet-on-wet onto the base coat, and the resulting multicoat is cured simultaneously. The improvement therein comprises decreasing the solvent required in said method and producing a rapidly curable coat, thereby ensuring a metallic coat with good aesthetic and weathering properties by preventing migration of metal particles from the metal pigment into the top coat, by employing as said first film-forming binder one consisting essentially of (a) a hydroxyl group-containing acrylic oligomer having an average molecular weight of 500 to 2000, (b) a non-yellowing polyisocyanate in an NCO/OH ratio of 0.5/1 to 1/0.5 relative to said acrylic oligomer, or a combination thereof with up to 30 percent by weight of the polyol (as non-volatile solids) of a melamine resin; and (c) a film-forming cellulose derivative, and as said second film-forming binder one consisting essentially of an acrylic oligomer as defined hereinabove and a polyisocyanate as defined hereinabove, in an NCO/OH ratio of 0.5/1 to 1/0.5 relative to said acrylic oligomer, or a combination thereof with up to 30 percent by weight of the polyol (as non-volatile solids) of a melamine resin.

The base coat composition mentioned above preferably contains a cellulose derivative in a proportion of 5 to 30 percent based on the nonvolatile content thereof.

The above-mentioned base coat composition and/or top coat composition may optionally contain an ultraviolet absorber and an antioxidant.

The acrylic polyol oligomer as used according to this invention includes, for example, copolymers of OH-containing unsaturated monomers such as hydroxyalkyl acrylates (e.g. β-hydroxyethyl acrylate, β-hydroxypropyl acrylate, etc.), and hydroxyalkyl methacrylate (e.g. β-hydroxyethyl methacrylates, etc.), with other unsaturated monomers such as acrylic acid and its esters (e.g. ethyl acrylate, propyl acrylate, butyl acrylate, etc.) and methacrylic acid esters. These acrylic polyol oligomers should have OH numbers in the range of 50 to 300, preferably 80 to 200, acid numbers in the range of 5 to 50, preferably 10 to 30, and number average molecular weights in the range of 500 to 2000, preferably 800 to 1400. If the number average molecular weight of the acrylic polyol oligomer is less than 500, the mechanical and other physical properties of the resulting film will be unsatisfactory, while a number average molecular weight in excess of 2000 will lead to only a low nonvolatile content at the time of coating and, therefore, the desired high nonvolatile contents will not be attained.

The polymerization method that can be used in the production of said acrylic polyol oligomer is optional and may for example be a process using a large quantity of a radical polymerization initiator or a process employing a large amount of a chain transfer agent such as an organic thiol compound.

The non-yellowing polyisocyanate compound includes, among others, such polyisocyanates as aliphatic or alicyclic diisocyanates such as hexamethylene diisocyanate (HMDI), isophoron diisocyanate (IPDI), hydrogenated xylylene diisocyanate (hydrogenated XDI), hydrogenated tolylene diisocyanate (hydrogenated TDI), etc., adducts of such polyisocyanates to polyols such as ethylene glycol, propylene glycol, trimethylolpropane, etc., and blocked polyisocyanates. Trimers of aliphatic or alicyclic diisocyanate such as HMDI or IPDI having an isocyanurate structure are preferable.

The proportion of said polyisocyanate, in terms of NCO/OH ratio, is within the range of 0.5/1 through 1/0.5. If the proportion is less than 0.5/1, the performance of the film will be adversely affected resulting in a too flexible, soft coat, whereas the use of polyisocyanates in an amount over 1/0.5 will increase the cost of the coating material and result in a hard, non-flexible, unserviceable coat.

While these polyisocyanate compounds may be employed singly, several different polyisocyanate compounds may be used in combination, or in conjunction with melamine resins for the purpose of securing a balance between the curing property of the composition and the physical performance of the coat. When a melamine resin is used in combination with the polyisocyanate compound, the former is used in a proportion of 5 to 30 percent (as nonvolatile solids) based on every 100 weight parts of the acrylic polyol oligomer. If the amount of such melamine resin exceeds the above range, the durability, especially the water resistance, of the coat will be sacrificed.

The following is a partial list of commercially available polyisocyanate compounds that can be employed in the practice of this invention. Coronate EH (Japan Polyurethane) and Desmodur KL-2444 (Bayer A. G.) in the HMDI series containing isocyanurate rings; Sumidur N, Desmodur L-2291 (Bayer A. G.) and Duranate 24A-90CX (Asahi Kasei) in the HMDI series containing biuret groups; Desmodur Z-4370 (Bayer A. G.) and T-1890 (Hultz in the IPDI series containing isocyanurate rings; and Takenate D-120N (Takeda Chemical Industries, Ltd.) in the hydrogenated XDI series.

The cellulose derivatives which may be employed in accordance with this invention include cellulose acetate butyrate (CAB), nitrocellulose (NC), etc.

The ultraviolet absorber that can be employed in accordance with this invention may be any of salicylic acid esters, benzophenones, benzotriazoles, benzoates and substituted acrylonitrile compounds, or a mixture thereof.

The antioxidant that can be employed in accordance with this invention may be any of, or a mixture of, imidazoles, phenols, amines, quinones, thiopropionic acid esters and organophosphites. Moreover, the base coat and/or the top coat composition according to this invention may contain a curing catalyst. The curing catalyst may be a known catalyst, and from the standpoints of reactivity, weather resistance and odor, is preferably an organotin compound.

The metallic pigment of the base coat composition may be aluminum pigment, copper pigment, mica powder or the like and its proportion may range from 2 to 20 weight parts per 100 weight parts of resin. The coloring pigment may be a conventional inorganic or organic pigment, and may be used in a proportion of 5 to 200 weight parts based on 100 weight parts of resin.

In the coating procedure, the base coat composition is first applied and after a setting time of 1 to 10 minutes at room temperature, the top coat composition is applied, followed by another setting time of 5 to 20 minutes at room temperature. The coats so applied are then cured. The curing conditions vary with different curing agents. In the case of a two-component system using a polyisocyanate, the curing temperature is room temperature to 120° C. When a blocked isocyanate or/and a melamine resin is employed, the curing temperature is 100° to 200° C.

The following examples are intended to illustrate this invention in further detail. In these examples, all parts and percents are by weight.

PRODUCTION EXAMPLE 1

[Production of acrylic polyol (A)]

A one-liter flask equipped with a stirrer, thermometer, nitrogen gas inlet pipe, cooler and drip funnel was charged with 170 g of an aromatic solvent (Solvesso 100, Esso) and the solvent was heated to 155° C. The flask was further charged with 116 g of n-butyl acrylate, 80 g of 2-hydroxyethyl acrylate, 4 g of acrylic acid and a mixture of 14 g of tert-butylperoxy-2-ethylhexanoate and 30 g of the aromatic solvent (Solvesso 100) dropwise at 155° C. over a period of 3 hours. After the dropwise addition had been completed, the mixture was maintained at 155° C. for a further 90 minutes. Then, the reaction mixture was cooled to 100° C. and the solvent was removed under a vacuum at 5 mmHg to give an acrylic copolymer. The characteristics of this acrylic copolymer resin are shown in Table 1.

PRODUCTION EXAMPLE 2

[Production of acrylic polyol (B)]

The procedure of Production Example 1 was repeated except that the following conditions were used instead. The characteristics of the resulting acrylic copolymer are set forth in Table 1.

| Reaction temperature | 130° C. | |
|---|---|---|
| Initial charge | Xylol | 170 g |
| Monomers | n-Butyl acrylate | 116 g |
| | 2-Hydroxyethyl acrylate | 80 g |
| | Acrylic acid | 4 g |
| | Lauryl mercaptan | 12 g |
| Initiator solution | 2,2'-Azobisisobutyronitrile | 6 g |
| | Butyl acetate | 120 g |

PRODUCTION EXAMPLE 3

[Production of acrylic polyol (C)]

The procedure of Production Example 1 was repeated except that the following conditions were used instead. The characteristics of the resulting acrylic copolymer are set forth in Table 1.

| Reaction temperature | 130° C. | |
|---|---|---|
| Initial charge | Xylol | 170 g |
| Monomers | n-Butyl acrylate | 128.4 g |
| | 2-Hydroxyethyl acrylate | 62 g |
| | n-Butyl methacrylate | 5.6 g |
| | Acrylic acid | 4 g |
| | 2-Mercaptoethanol | 8 g |
| Initiator solution | 2,2'-Azobisisobutyronitrile | 6 g |
| | Butyl acetate | 120 g |

TABLE 1

| | Characteristics of Resins | | |
|---|---|---|---|
| | Product | | |
| Specification | Acrylic polyol A | Acrylic polyol B | Acrylic polyol C |
| Nonvolatile (%) | 99 | 98 | 99 |
| OH number | 193 | 150 | 193 |
| Acid number | 16 | 16 | 16 |
| Tg (°C.) | −40 | −40 | −40 |
| Mn | 900 | 950 | 1100 |
| $\alpha = \bar{M}_w/M_n$ | 2.0 | 2.0 | 2.0 |

EXAMPLE 1

On a tempered steel sheet pretreated with zinc phosphate was formed an electro-deposition film and, then, a primer surfacer. Then, a base coat composition of the following formulation A and a top coat composition of the following formulation B were successively applied in a wet-on-wet relation. The coats were then baked at 100° C. for 30 minutes.

The coating viscosities were adjusted to 20 seconds (Ford Cup #4/25° C.) for the base coat and 25 seconds (Ford Cup #4/25° C.) for the top coat. The diluents for these adjustments were a 50:50 mixture of butyl acetate and xylol for the base coat and an aromatic hydrocarbon solvent mixture (Solvesso 100 and Solvesso 150, Esso) for the top coat.

The coating was performed at 25° C., and an interval of about 3 minutes was provided between the applications of the base and top coat compositions. After application of the top coat composition, the work was allowed to stand for 10 minutes and, then, oven-baked to cure.

The performance characteristics of the resulting coating film are shown in Table 2.

| (Formulation A - Base coat) | |
|---|---|
| Acrylic polyol | 100 parts |
| Aluminum pigment A | 30.4 parts |
| (Asahi Kasei, Alpaste 51-231) | |
| Cellulose derivative solution | 64 parts |
| (Eastman Kodak, 20% CAB in butyl acetate) | |
| Isocyanate prepolymer A | 87 parts |
| (Bayer A. G., Desmodur Z-4370) | |
| Isocyanate prepolymer B | 21 parts |
| (Japan Polyurethane, Coronate EH) | |
| Solvent (xylol) | 10 parts |
| Total | 312.4 parts |
| (Formulation B - Top coat) | |
| Acrylic polyol A | 100 parts |
| Isocyanate prepolymer A | 87 parts |
| Isocyanate prepolymer B | 21 parts |
| Surface modifier | 0.5 part |
| (Monsant, Modaflow solution) | |
| Ultraviolet absorber | 3.6 parts |
| (Ciba-Geigy, Tinuvin LS-770) | |
| Solvent (xylol) | 10 parts |
| Total | 222.1 parts |

EXAMPLE 2

A coating film was produced by the same procedure as Example 1 except that Formulation C was used for the base coat and Formulation D for the top coat. The performance characteristics of the coating film are shown in Table 2.

| (Formulation C - Base coat) | |
|---|---|
| Acrylic polyol C | 100 parts |
| Aluminum pigment A | 30.4 parts |
| Cellulose derivative solution | 64 parts |
| Isocyanate prepolymer A | 125.4 parts |
| Solvent (xylol) | 10 parts |
| Total | 329.8 parts |
| (Formulation D - Top coat) | |
| Acrylic polyol C | 100 parts |
| Isocyanate prepolymer A | 125.4 parts |
| Surface modifier | 0.5 part |
| Solvent (xylol) | 10 parts |
| Total | 235.9 parts |

EXAMPLE 3

A coating film was produced by the same procedure as Example 1 except that Formulation E and Formulation F were used. The performance characteristics of the coating film are shown in Table 2.

| (Formulation E - Base coat) | |
|---|---|
| Acrylic polyol B | 100 parts |
| Aluminum pigment B | 30 parts |
| (Toyo Ink, Alpaste 1109MA) | |
| Cellulose derivative solution | 85 parts |
| Isocyanate prepolymer A | 96 parts |
| Surface modifier | 0.5 part |
| Solvent (xylol) | 10 parts |
| Total | 321.5 parts |
| (Formulation F - Top coat) | |
| Acrylic polyol B | 100 parts |
| Isocyanate prepolymer A | 96 parts |
| Surface modifier | 0.5 part |
| Ultraviolet absorber A | 1.0 part |
| Antioxidant | 2.0 parts |
| (Ciba-Geigy, Irganox 1010) | |
| Solvent (xylol) | 10 parts |
| Total | 209.5 parts |

EXAMPLE 4

A coating film was produced by the same procedure as Example 1 except that 0.2 part of dibutyltin dilaurate was added to Formulation A for the base coat. The performance characteristics of the film are shown in Table 2.

EXAMPLE 5

A coating film was produced by the same procedure as Example 2 except that the cellulose derivative solution was omitted from Formulation C for the base coat. The performance characteristics of the film are shown in Table 2.

EXAMPLE 6

A commercial acrylate-melamine coating material of melamine-curing type, which is commonly employed, and the coating composition of this invention were used as the base coat composition and the top coat composition, respectively. The base coat was applied by diluting the coating material to 15″/#4FC/25° C. with a solvent mixture of butyl acetate, ethyl acetate and xylene (0.25/0.25/0.5 wt. part) and after an interval of 3 minutes, the top coat composition of this invention was applied. The work was baked at 140° C. for 30 minutes. The dilution of the top coat composition was carried out in the same manner as Example 1. The performance characteristics of the resulting film are shown in Table 2.

mance characteristics of the film are shown in Table 2.

| (Formulation G - Base coat) | | |
|---|---|---|
| Acrylic polyol (Dainippon Ink and Chemicals Inc., Acrydic 47-712) | | 100 parts |
| Butoxylated melamine (Dainippon Ink and Chemicals Inc., Super Bekkamin L-117-60) | | 21 parts |
| Aluminum pigment B | | 8.5 parts |
| Solvent (n-butanol/xylol) | | 7.1 parts/16 parts |
| | Total | 152.6 parts |
| (Formulation H - Top coat) | | |
| Acrylic polyol A | | 100 parts |
| Isocyanate prepolymer A | | 87 parts |
| Butoxylated melamine (Mitsui Toatsu Co., Ltd., Uvan 20SE-60) | | 15 parts |
| Surface modifier | | 0.5 part |
| Ultraviolet absorber A | | 2.0 parts |
| Solvent (xylol) | | 10 parts |
| | Total | 214.5 parts |

| (Formulation K - Base coat) | | |
|---|---|---|
| Acrylic polyol A | | 100 parts |
| Butoxylated melamine (Mitsui Toatsu, Uvan 20SE-60) | | 71 parts |
| Aluminum pigment A | | 24 parts |
| Cellulose derivative solution | | 73 parts |
| Solvent (xylol) | | 10 parts |
| | Total | 278 parts |
| (Formulation L - Top coat) | | |
| Acrylic polyol A | | 100 parts |
| Butoxylated melamine (Mitsui Toatsu, Uvan 20SE-60) | | 71 parts |
| Surface modifier | | 0.4 part |
| Ultraviolet absorber A | | 1.5 parts |
| Solvent (xylol) | | 10 parts |
| | Total | 182.9 parts |

TABLE 2
Performance Characteristics of Coating Films

| Test parameter | Example 1 | Example 2 | Example 3 | Example 4 | Example 5 | Example 6 | Control Example 1 | Control Example 2 |
|---|---|---|---|---|---|---|---|---|
| Nonvolatile matter (%) at spraying | | | | | | | | |
| Base coat | 52 | 47 | 53 | 52 | 62 | 23 | 23 | 40 |
| Top coat | 64 | 59 | 63 | 64 | 65 | 59 | 40 | 53 |
| Appearance | Very good | Good | Very good | Very good | Fair | Good | Good | Fair |
| Gloss | 94 | 93 | 94 | 93 | 92 | 95 | 95 | 93 |
| Hardness | 2H | 2H | 2H | 2H | 2H | 2H | 2H | 5B |
| Weather resistance | | | | | | | | |
| % Gloss retention | 99 | 99 | 99 | 99 | 99 | 99 | 99 | — |
| ΔE | 0.90 | 1.24 | 1.20 | 1.10 | 1.10 | 1.20 | 1.00 | — |
| Solvent resistance | Good | Good | Good | Good | Good | Good | Good | Not Good |

CONTROL EXAMPLE 1

The coating system used commonly today was used for control purposes. The base coat composition was diluted in the same manner as Example 6 and the top coat was applied at a coating viscosity of 20 seconds/#4FC/25° C. A coating film was produced under otherwise the same conditions as described in Example 6. The performance characteristics of the resulting film are shown in Table 2.
(Formulation I—Base Coat)
Same as Formulation G of Example 6.

| (Formulation J - Top coat) | |
|---|---|
| Acrylic polyol (Dainippon Ink and Chemicals Inc., Acrydic 44-179) | 100 parts |
| Butoxylated melamine (Dainippon Ink and Chemicals Inc., Super Bekkamin L-117-60) | 27.2 parts |
| Surface modifier | 0.4 part |
| Solvent (xylol) | 17.3 parts |
| Ultraviolet absorber A | 1.2 parts |
| Total | 146.1 parts |

CONTROL EXAMPLE 2

Formulation K and Formulation L, both shown below, were used for the base coat and the top coat, respectively, and the baking was performed at 140° C. for 30 minutes. Otherwise the same procedure as Example 1 was followed to produce a coating film. The perfor- The testing methods are as follows.
(1) Nonvolatile matter at spraying: For the base coat composition, the nonvolatile matter at a Ford Cup viscosity of 20 seconds (25° C.) at spraying was determined. As to the top coat composition, the nonvolatile matter at a Ford Cup viscosity of 30 seconds (25° C.) at spraying was determined.
(2) Appearance: The metallic feeling and sharpness of the film were visually evaluated.
(3) Gloss: The gloss at 60° was measured.
(4) Hardness: The Mitsubishi-Uni pencil was used.
(5) Weather resistance: QUV (UV 4 hrs., moisture resistance 4 hrs., 60° C.): Each specimen was subjected to 8 cycles.
(6) Solvent resistance: The xylol rubbing test was performed.

What is claimed is:
1. In a two-coat, one-bake metallic coating method wherein a base coat composition containing a first film-forming binder, a metallic pigment and a solvent for said first film-forming binder is applied, a clear top coat composition containing a second film-forming binder and a solvent thereof is applied wet-on-wet onto the base coat, and the resulting multicoat is cured simultaneously, the improvement which comprises employing as said first film-forming binder one consisting essentially of (a) a hydroxyl group-containing acrylic oligomer having an average molecular weight of 500 to 2000, (b) a non-yellowing polyisocyanate in an NCO═OH ratio of 0.5/1 to 1/0.5 relative to said acrylic oligomer, or a combination thereof with up to 30 percent by weight of the polyol (as non-volatile solids) of a melamine resin; and (c) a film-forming cellulose derivative; and as said second film-forming binder one consisting essentially of an acrylic oligomer as defined hereinabove, and a polyisocyanate as defined hereinabove, in an NCO/OH ratio of 0.5/1 to 1/0.5 relative to said acrylic oligomer, of a combination thereof with up to 30 percent by weight of the polyol (as non-volatile solids) of a melamine resin.

2. The method as claimed in claim 1 wherein at least one of said first and second film-forming binders contains said melamine resin.

3. The method as claimed in claim 1 wherein said melamine resin is absent from both binders.

4. The method as claimed in claim 1 wherein at least one said base coat and clear top coat compositions further contains an ultraviolet absorber and an antioxidant.

5. The method as claimed in claim 1 wherein said acrylic oligomer has an OH number of 50 to 300 and an acid number of 5 to 50.

6. The method as claimed in claim 1 wherein said metallic pigment is present in said base coat composition in a proportion of 2 to 20 parts by weight per 100 parts by weight of said first film-forming binder.

7. The method as claimed in claim 6 wherein a coloring pigment is present in said base coat composition in a proportion of 5 to 200 parts by weight of said first film-forming binder.

8. A method according to claim 1 wherein said melamine resin is absent from both binders; wherein at least one of said base coat and clear top coat compositions further contains an ultraviolet absorber and an antioxidant; wherein said acrylic oligomer has an OH number of 50 to 300 and an acid number of 5 to 50; wherein said metallic pigment is an aluminum pigment and is present in said base coat composition in a proportion of 2 to 20 parts by weight per 100 parts by weight of said first film-forming binder.

* * * * *